Feb. 3. 1925.

H. H. JUNKE 1,524,790

SAWING MACHINE

Filed March 28, 1924   2 Sheets-Sheet 1

INVENTOR.
Herman H Junke
BY Albert H. Merrill
ATTORNEY.

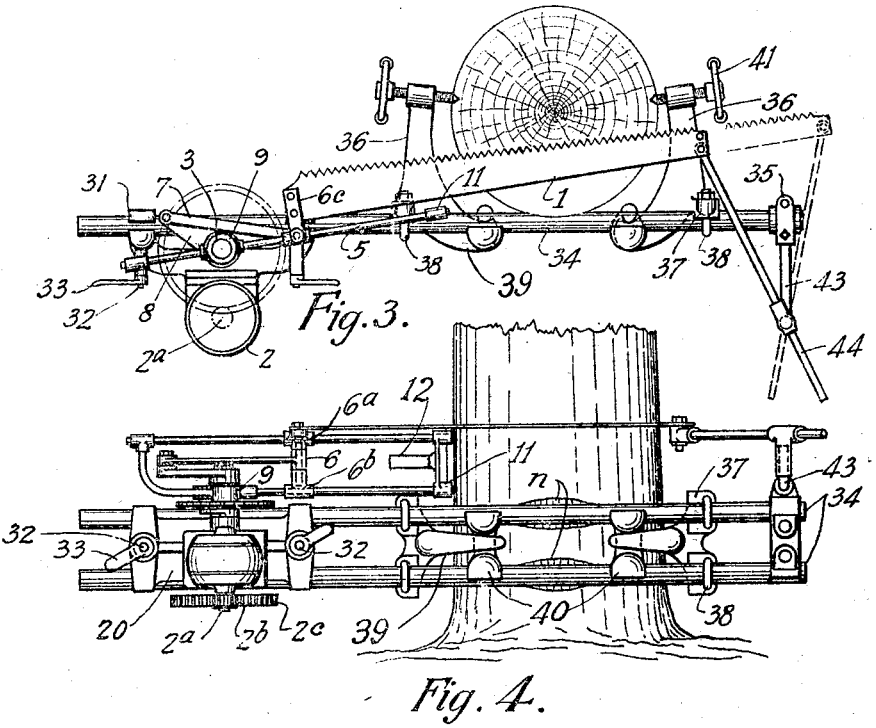

Patented Feb. 3, 1925.

1,524,790

UNITED STATES PATENT OFFICE.

HERMAN H. JUNKE, OF LOS ANGELES, CALIFORNIA.

SAWING MACHINE.

Application filed March 28, 1924. Serial No. 702,544.

*To all whom it may concern:*

Be it known that I, HERMAN H. JUNKE, a citizen of the German Republic, residing in the city and county of Los Angeles, Eagle Rock Annex, State of California, have invented a new and useful Sawing Machine, of which the following is a specification.

My invention relates to a motor-driven reciprocatory saw adapted both for cutting down trees, whether standing erect or lying prone, and also for sawing timbers in erect or other positions.

Among the objects of the invention are to provide a motor driven saw for cutting down very large trees without the necessity of stopping the motor or saw to readjust the saw during its operation; to provide improved means for securely clamping the supporting frame of the saw to the tree; and to in general simplify the construction and render less expensive the cost of manufacture of sawing machines to perform the functions above set forth.

A further object of this invention is to provide a sawing machine having a detachable clamping device for use in cutting down trees, said clamping device being readily detached in order to render the apparatus more simple and compact when occasion requires that the same be used in a factory or shop.

This machine is portable, being of relatively light weight. Among other uses it is adapted for operation in the construction of buildings, being light enough to be carried up ladders to saw timbers preparatory to fitting them in their places in the upper stories of the building under construction.

Figure 1:
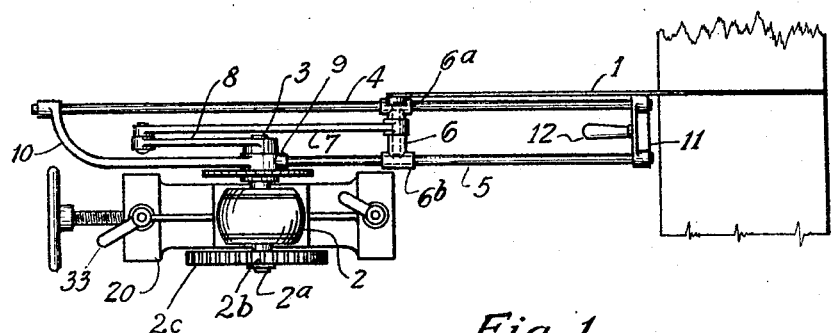
Figure 2:
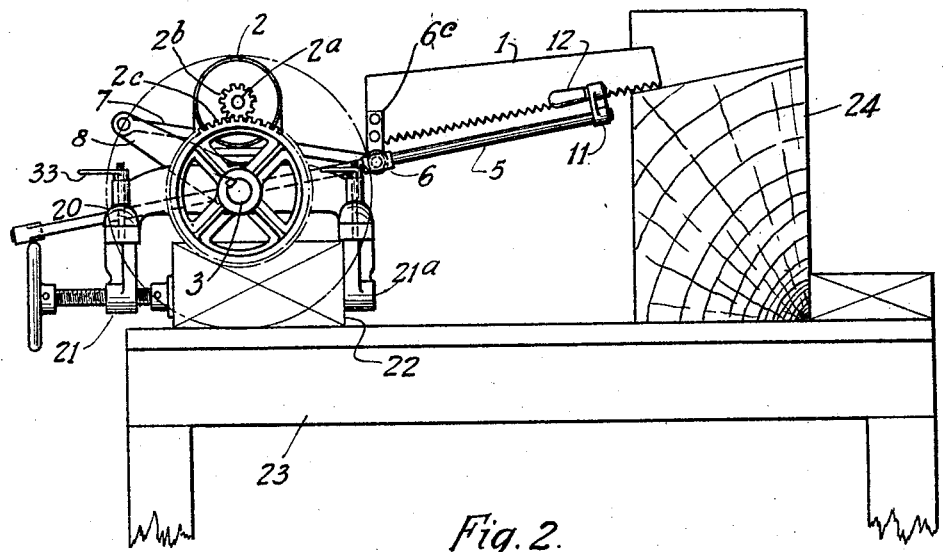

Referring to the accompanying drawings which illustrate the invention, Figure 1 is a plan view of the machine in position for sawing horizontal timbers; Figure 2 is a side elevation thereof; Figure 3 is a plan view of the machine in position for cutting down a standing tree. In this view a clamping device and supporting frame is added in order to provide for securing the machine to the trunk of the tree. Figure 4 is a side elevation of Figure 3; Figure 5 is a section of the automatic feeding device on line $X^5$—$X^5$ of Figure 6; Figure 6 is a view of Figure 5 looking from right to left.

Referring in detail to the drawings, and first describing the machine without the device for attaching it to a tree, the saw blade 1 may be driven by an electric motor 2, the shaft $2^a$ of which extends at right angles to the plane of said saw blade, and by means of the gears $2^b$ and $2^c$ drives the main shaft 3. The guiding means for the saw blade includes the swinging parallel guide rods 4 and 5, upon which travels the crosshead 6, which is propelled by the link 7 attached to the crank arm 8. The guiding and supporting frame for the saw blade is pivotally mounted upon the main shaft 3 by means of a bearing member 9 which is desirably cast integral with straight guide rod 5 on one side and the curved bracing rod 10 on the diametrically opposite side. The outer end of said bracing rod 10 is deflected as shown in Fig. 1 and is made fast to the long guide rod 4, a portion of said rods 4 and 10 being parallel. To complete this frame a head 11 is provided at the other end to unite rods 4 and 5 in parallelism to each other, a handle 12 being mounted on said crosshead 11 for manually moving the swinging frame and saw blade 1. By curving the outer end portion of rod 10 as shown, a bracing effect is obtained and a superior guiding frame is provided.

The saw-carrying head 6 is formed with sleeves $6^a$ and $6^b$, which slide upon guide rods 4 and 5. From said head 6 also projects the saw-carrying arm $6^c$.

The motor 2 is provided with a base 20 furnished with a vise 21 and vise block $21^a$. (Figures 1 and 2), gripping a sill 22 fixed to table 23, which supports the timber 24.

Referring to Figures 3 to 6, the machine, when the tree-gripping device has been added thereto, comprises the base-blocks 31 with which co-operate the threaded bolts 32 and handled nuts 33, these parts securely gripping the parallel bars 34 in order to support thereon the motor base 20 and sawing apparatus carried by said base. Said bars 34 are connected at their outer ends by a crosshead 35. Between said crosshead 35 and the motor 2 is a pair of co-operating adjustable bracket arms 36 to engage opposite sides of a tree and having a pinching engagement with the parallel bars 34 of the supporting frame. These bracket arms 36 are arranged as shown in Figures 3 and 4, being secured to bars 34 by means of saddles 37 and U bolts 38. Each of said bracket arms 36 is slightly curved on its inner face and has a heel portion 39 which extends between and beyond the bars 34, and terminates in the ears 40 operatively engaging the outer surfaces of said bars 34. When the pointed hand screws 41 at the other ends of bracket arms 36 are forced against opposite sides of the tree, the ears 40 are forced firmly against the outer sides of bars 34, resulting in bars 34 being pressed firmly into the notches $n$ (previously cut into the tree trunk), and the entire machine is thus sustained securely in the operative position until the tree is sawn completely across.

An arm 43 is bolted to crosshead 35, said arm having pivoted to its outer end the swinging saw-guiding arm 44, the other end of said arm 44 being pivoted to the free end of the saw blade 1.

The automatic feeding device shown in detail in Figures 5 and 6 comprises the ratchet wheel 50 mounted in fixed relation to bearing sleeve 9 on main shaft 3. Said ratchet wheel 50 is operated by dog 51 pivoted to the free end of arm 52, said dog 51 being yieldingly maintained in engagement with wheel 50 by means of spring 53. Said arm 52 is pivoted at 54 to the motor base 20, being positioned for intermittent operation by cam 55 fixed to main shaft 3.

When it is desired to convert the simplified form of the device shown in Figures 1 and 2 into a tree-sawing machine, remove vise 21 and block 21ª and substitute the base blocks 31, clamping these blocks on to the parallel bars 34, to which is permanently connected the saw-guiding arm 44. The tree-gripping bracket arms 36 also remain with bars 34.

As illustrated in the drawings, the framework of the machine is strong enough to support a heavier motor than the electric motor shown, and it is to be understood that the invention is not limited to the inclusion of the electric motor as an element thereof, but that gas or possibly other motors may be used, and the construction may be otherwise varied, within the scope of the claims, without departing from the spirit of the invention.

I claim:

1. In a sawing machine, the combination with a saw proper, motor to operate said saw proper, a supporting frame, and means to mount said motor on said frame; of a pair of cooperating bracket arms adjustable along said frame and having a pinching engagement therewith, said bracket arms each having a tree-engaging element, and means to adjust said element forcibly against a tree-trunk.

2. In a sawing machine, the combination with a saw proper, motor to operate said saw proper, an elongated frame, and means to mount said motor on said frame; of a pair of co-operating bracket arms carried by said frame and adjustable longitudinally therealong, each of said bracket arms comprising a saddle portion engaging one side of said frame and a heel portion engageable with the opposite side thereof, said heel portions being directed toward each other, the free ends of each said bracket arms carrying a tree-engaging element, and means to adjust said element forcibly against a tree-trunk.

3. In combination, a saw proper, a motor operatively connected therewith, a frame comprising a pair of parallel bars, means to attach said frame to said motor, and a pair of co-operating bracket arms mounted on said frame, each of said bracket arms having an intermediate portion engaging one side of said frame and a heel portion projecting between the bars of said frame and operatively engaging the other side thereof, the other end of each of said bracket arms being provided with an adjustable element to forcibly engage a tree trunk.

HERMAN H. JUNKE.